C. I. HALL.
ELECTRIC MOTOR.
APPLICATION FILED DEC. 5, 1914.
1,234,465.
Patented July 24, 1917.
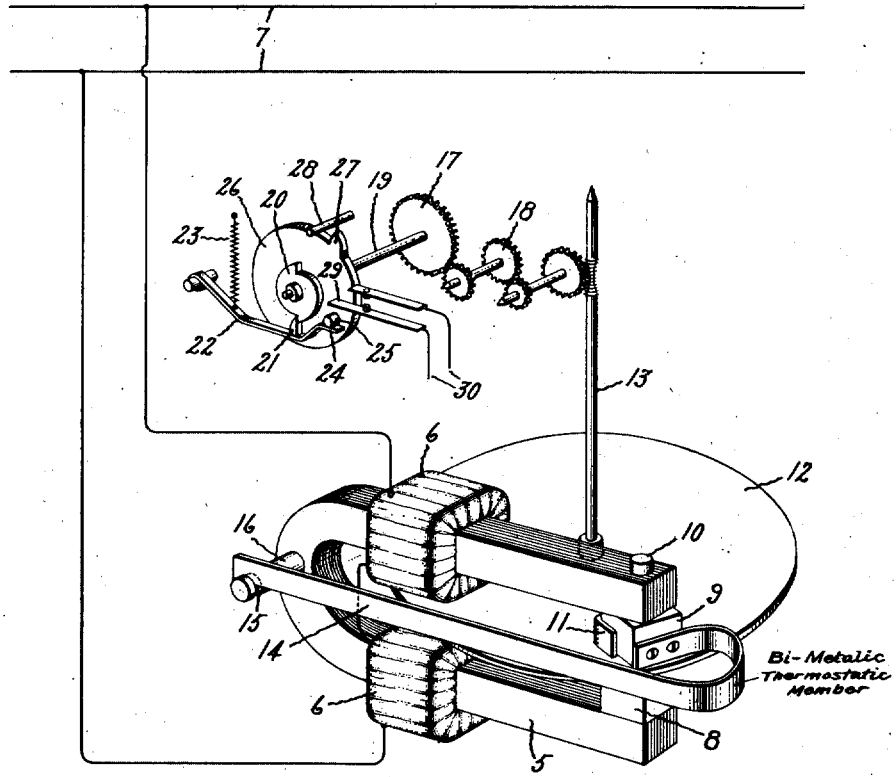
Witnesses:
George W. Tilden
J. Ellis Glen
Inventor:
Chester I. Hall,
by Albert H. Davis
His Attorney.

UNITED STATES PATENT OFFICE.

CHESTER I. HALL, OF FORT WAYNE, INDIANA, ASSIGNOR TO GENERAL ELECTRIC COMPANY, A CORPORATION OF NEW YORK.

ELECTRIC MOTOR.

1,234,465.

Specification of Letters Patent.

Patented July 24, 1917.

Application filed December 5, 1914. Serial No. 875,628.

*To all whom it may concern:*

Be it known that I, CHESTER I. HALL, a citizen of the United States, residing at Fort Wayne, county of Allen, State of Indiana, have invented certain new and useful Improvements in Electric Motors, of which the following is a specification.

My invention relates to electric motors and particularly to substantially constant speed induction motors adapted to be used as time-keeping devices.

The use of an electric motor in place of an ordinary spring-actuated clockwork mechanism is of particular advantage in numerous apparatus. Electrical demand apparatus serves as an especially good example of an instance where such substitution is peculiarly advantageous. In certain well known types of electrical demand apparatus, a time-keeping device is necessary to determine the equal intervals of time during which the demand is measured or to determine the times during which equal energy intervals are consumed. A clock for this type of apparatus should run for at least one month without winding or attention, since the indications or registrations of apparatus of this character are only examined once each month. A spring-actuated clockwork mechanism for the satisfactory operation of commercial demand apparatus is unreasonably expensive. A satisfactory electrically-actuated clock, such as a constant speed electric motor, is particularly adapted for electrical demand apparatus, since a time-keeping device of this character will run with little or no attention whenever it is supplied with the necessary electric energy. The difficulty in the provision of a satisfactory electric motor for operation as a time-keeping device consists chiefly in providing a motor which operates at substantially constant speed under all normal conditions of a commercial electric circuit. Commercial electric circuits are subject to voltage and frequency fluctuations, and variations in these two characteristics affect the speed of the ordinary types of electric motor.

The object of my present invention is to provide a novel form of induction motor adapted to operate at substantially constant speed when supplied with alternating current energy from a commercial electric circuit. More particularly the object of my invention is to provide an electric motor of the induction motor type whose speed is substantially independent of the ordinary fluctuations of voltage occurring in commercial electric circuits. Another object of my invention is to provide means for compensating for changes in speed of a motor occasioned by changes in the surrounding temperature, and particularly to provide means for modifying the torque of the motor in response to variations in temperature.

In the embodiment of my invention herein illustrated and described, I provide a magnetic member having oppositely positioned poles separated by a small air gap and a metallic disk armature mounted for rotation in the air gap. The magnetic member is energized by a coil adapted to be connected to a commercial alternating current circuit. The motor depends for its torque upon the phase displacement between the leakage flux cutting the disk armature and the main flux between the poles of the magnetic member which also cuts the disk armature. This torque is controlled by the electromagnetic drag generated by the magnetic member. It is apparent, therefore, that the torque and the electromagnetic drag are both dependent upon the value of the total flux generated, which renders the motor substantially independent of voltage variations. An increase of voltage, which generates an increased flux, will create a large value of torque and a proportionally large value of magnetic drag, thus maintaining substantially constant speed. I obtain close calibration of speed by mounting upon one of the poles of the magnetic member a small copper shading coil. This pole is rotatable, so that the torque generated by the shading coil may be varied. The motor is so designed that the shading coil normally operates practically in a neutral position, so that it has but very little effect upon the speed of the motor. The speed may, therefore, be regulated by a micrometer adjustment for rotating the pole, and hence the shading coil, in one direction or the other. The use of the leakage flux in the development of the motor torque does not entirely eliminate temperature errors, which would be very excessive if the motor depended upon the torque generated by copper shading coils, as has heretofore been the usual practice. I eliminate the temperature error in my novel form of induction electric motor by a thermostatic adjustment of the rotatable pole of the magnetic member. To this end, I operatively connect a duplex metal thermostatic member to the rotatable pole in such a manner that an increase of atmospheric temperature will rotate the pole in a direction tending to increase the speed of the disk armature, thus compensating entirely any tendency to reduce the motor speed with an increase of temperature, and vice versa.

The novel features which I believe to be patentably characteristic of my invention are definitely indicated in the claims appended hereto. The principle of operation and mode of construction of an induction electric motor embodying my present invention will be understood from the following description taken in connection with the accompanying drawing, in which:

The figure is a diagrammatic view in perspective of an electric motor embodying my invention operatively connected to a circuit closer for closing an electric circuit at equal time intervals.

The motor comprises a U-shaped magnetic member 5 upon each leg of which is mounted an electric current carrying coil 6. The coils 6 are connected in series with each other and are adapted to be supplied with current from the conductors 7 of an alternating current circuit. The U-shaped magnetic member is provided at its ends with two poles 8 and 9 separated from each other by a small air gap of substantially uniform width. The pole 8 is rigidly secured to the magnetic member, while the pole 9 is secured to a pin 10 pivotally mounted in the U-shaped magnetic member. The pole 9 carries a shading coil such as a short-circuited copper conductor 11 whose position may be adjusted by the rotation of the pole 9.

A metallic disk armature 12 of conducting material, such as copper or aluminum, is secured to a pivotally mounted shaft 13, and is positioned to rotate in the air gap between the poles 8 and 9 of the U-shaped magnetic member. The disk armature 12 is further so positioned with respect to the U-shaped magnetic member that it is subjected to the influence of the leakage flux of the magnetic member. In other words the disk armature is so positioned that it is cut by the leakage flux which passes from one leg to the other of the U-shaped magnetic member. The leakage flux of the U-shaped magnetic member is substantially in phase with the current flowing in the coils 6. The main flux of the magnetic member passes across the air gap between the poles 8 and 9, and, since the circuit of this flux is mainly through magnetic material of low reluctance, this flux will lag in time phase substantially 90 electrical degrees behind the current flowing in the coils 6. The phase displacement between the leakage flux and the main flux cutting the disk armature develops a torque tending to turn the armature.

The short-circuited coil 11 is arranged so that in normal operation it occupies a practically neutral position, so that it develops little if any motor torque, thus having little or no effect on the speed of the motor. It will be seen that the speed of the motor may be changed one way or another by rotating the pole 9. Rotation of the pole 9 thus serves as a means for calibrating the speed of the motor.

A duplex or bi-metallic thermostatic member or bar 14 of any well known design is connected to the pole 9. It will be observed that the thermostatic member 14 extends for the greater part substantially parallel to the legs of the U-shaped magnetic member and has at its end of connection to the pole 9 a curved portion, being generally of crook-like configuration. The thermostatic member is loosely positioned at its free end in a groove 15 of a stud 16 secured to the U-shaped magnetic member. Upon an increase of the surrounding atmospheric temperature, the thermostatic member 14 operates to rotate the pole 9 in a direction tending to increase the speed of the disk armature, thus compensating entirely for any tendency to reduce the speed of the disk armature occasioned by the increased temperature. Upon a decrease of the surrounding temperature the effect of the thermostatic member 14 is just the reverse.

The rotatable shaft 13 is operatively connected to a gear 17 through a train of reduction gearing 18. The gear 17 is secured at one end of a shaft 19 while a cam 20 is secured at the other end of this shaft. A cam-follower 21 is secured to a pivoted arm 22 and is operatively held in engagement with the cam 20 through the action of a spring 23. The arm 22 is provided at one end with a finger 24 which is adapted to engage a pin 25 on a disk 26 loosely mounted on the shaft 19. Rotation of the disk 26 is limited in one direction by the engagement of the pin 25 with the finger 24 and in the other direction by the engagement of a lug 27 with a stop-pin 28. The disk armature of the motor rotates the cam 20 at substantially constant speed in a counterclockwise direction. Twice during each revolution of the cam 20 the cam-follower 21 drops off the shoulders of the cam surface, whereupon finger 24, responding to the action of the spring 23, imparts a quick kick to the pin 25. The pin 25 moves in a counterclockwise direction in response to the kick imparted thereto, and engages a resilient contact-member 29 of a pair of coöperating contacts arranged in an electric circuit 30. The engagement of the pin 25 with the contact-member 29 effects a momentary closing of the circuit 30, but due to the balance of the disk 26 the pin 25 drops immediately back into contact with the finger 24. It will thus be seen that the coöperating contacts of the circuit 30 are momentarily closed each time a predetermined number of revolutions of the disk armature have been completed, that is, at equal time intervals.

From the foregoing description it will be apparent to those skilled in the art that I have provided a simple, reliable, and inexpensive type of substantially constant speed electric motor particularly adapted to be used as a time-keeping device. The motor is substantially independent of the ordinary fluctuations of voltage such as occur in commercial electric circuits, and is furthermore compensated for temperature variations. The speed of the motor is determined by the balance between the electromagnetic torque and the electromagnetic damping. Variations of the flux generating the electromagnetic torque and damping must necessarily have an effect varying directly with the value of the flux and therefore the balance or the ratio of flux to damping remains substantially constant under variations of voltage such as occur in commercial circuits. The speed of the motor is thus substantially constant under all ordinary conditions. The motor is peculiarly adapted for use in electrical demand apparatus, but may of course be used with advantage wherever a time-actuated or constant speed action or movement is desired.

I have explained my invention by illustrating and describing a certain specific embodiment thereof, but it will be readily understood by those skilled in the art that the invention may be embodied in other forms than that shown and described. I, accordingly, do not wish to be restricted to the particular construction or application disclosed herein by way of example for the purpose of setting forth my invention in accordance with the patent statutes. The terms of the appended claims are, therefore, not restricted to the precise structure disclosed, but are intended to cover all changes and modifications within the spirit and scope of my invention.

What I claim as new and desire to secure by Letters Patent of the United States, is:—

1. In an induction electric motor, a movable shading coil, and temperature responsive means operatively connected to said coil.

2. In an induction electric motor, a movable pole carrying a short-circuited coil, and means for moving said pole in response to changes in temperature.

3. In an induction electric motor, a rotatable disk armature, induction motive means tending to rotate said armature, a short-circuited coil associated with said means, and a thermostatic member adapted to vary the effect of said short-circuited coil upon said means.

4. In an induction electric motor, a rotatable disk armature, induction motive means tending to rotate said armature, a movable pole having a short-circuited coil associated with said induction motive means, and temperature responsive means operatively connected to said pole.

5. In an induction electric motor, a U-shaped magnetic member having its two legs uniformly spaced apart, a pole piece mounted on the inner end of each leg of said member, said pole pieces being separated from each other by a relatively narrow air gap of substantially uniform width while the distance between the uniformly spaced legs of said member is many times greater than the width of said air gap, an electric current carrying coil associated with said member, and a metallic disk armature mounted for rotation in the air gap between said pole pieces and positioned to be subjected to the influence of the leakage flux of said magnetic member whereby a torque tending to turn said disk armature is developed by the difference in time phase between the leakage flux of said magnetic member and the main flux across said air gap.

6. In an induction electric motor, a magnetic member having main poles separated by a relatively narrow air gap, an electric current carrying coil associated with said member, and a metallic disk armature mounted for rotation in the air gap between said main poles and positioned to be subjected to the influence of a leakage flux from said magnetic member, the length of the air path of said leakage flux being many times greater than the width of the air gap between said main poles whereby there is a material and an abrupt change in the time phase of the main flux across said air gap and the leakage flux to which said disk armature is subjected.

7. In an induction electric motor, a magnetic member having oppositely positioned poles separated by a small air gap, one of said poles being movable and carrying a short-circuited coil, an electric current carrying coil mounted on said member, and a metallic disk armature mounted for rotation in said air gap and positioned to be subjected to the influence of the leakage flux of said magnetic member whereby a torque tending to turn said disk is developed by the phase displacement between the leakage flux and the main flux across said air gap.

8. In an induction electric motor, a magnetic member having oppositely positioned poles separated by a small air gap, one of said poles being movable and carrying a short-circuited coil, an electric current carrying coil mounted on said member, a metallic disk armature mounted for rotation in said air gap, and positioned to be subjected to the influence of the leakage flux of said magnetic member whereby a torque tending to turn said disk is developed by the phase displacement between the leakage flux and the main flux across said air gap, and temperature responsive means operatively related to said movable pole.

9. In an induction electric motor, a magnetic member having oppositely positioned poles, means for developing an alternating magnetic flux in said magnetic member, a metallic disk armature mounted for rotation between said poles and positioned to be subjected to the influence of the leakage flux of said magnetic member, said poles being so related with respect to one another that the main flux thereacross differs in time phase from the leakage flux of said magnetic member, and means for rendering the torque developed by said leakage and main fluxes and tending to turn said disk armature substantially independent of changes caused by temperature variations.

10. In an induction electric motor, a U-shaped magnetic member having oppositely positioned poles separated by an air gap, one of said poles being movable and carrying a short-circuited coil, an electric current carrying coil mounted on said member, a metallic disk armature mounted for rotation in said air gap and positioned to be subjected to the influence of the leakage flux of said magnetic member whereby a torque tending to turn said disk armature is developed by the phase displacement between the leakage flux and the main flux across said air gap, and a thermostatic member operatively related to said movable pole and adapted to adjust the position of said short-circuited coil in response to temperature variations.

11. In an induction electric motor, a magnetic member having oppositely positioned poles separated by an air gap, one of said poles being pivotally mounted and carrying a short-circuited coil, an electric current carrying coil mounted on said member, a metallic disk armature mounted for rotation in said air gap and positioned to be subjected to the influence of the leakage flux of said magnetic member whereby a torque tending to turn said disk armature is developed by the phase displacement between the leakage flux and the main flux across said air gap, and a bi-metallic thermostatic member operatively connected to said pivotally mounted pole and adapted to turn said pole through a slight angle in response to temperature variations.

In witness whereof, I have hereunto set my hand this 2d day of December, 1914.

CHESTER I. HALL.

Witnesses:
 ROBT. MÜLLER,
 K. D. FITCH.